(12) United States Patent
Sakai et al.

(10) Patent No.: US 12,187,849 B2
(45) Date of Patent: Jan. 7, 2025

(54) FLAME-RETARDANT POLYIMIDE MOLDING MATERIAL AND MOLDED OBJECT

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP); Naoki Kaneko, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 630 days.

(21) Appl. No.: 17/435,111

(22) PCT Filed: Feb. 25, 2020

(86) PCT No.: PCT/JP2020/007359
§ 371 (c)(1),
(2) Date: Aug. 31, 2021

(87) PCT Pub. No.: WO2020/179532
PCT Pub. Date: Sep. 10, 2020

(65) Prior Publication Data
US 2022/0135742 A1 May 5, 2022

(30) Foreign Application Priority Data

Mar. 7, 2019 (JP) ................................. 2019-041766

(51) Int. Cl.
| | | |
|---|---|---|
| *C08J 5/10* | (2006.01) | |
| *C08G 73/10* | (2006.01) | |
| *C08J 5/04* | (2006.01) | |
| *C08K 3/34* | (2006.01) | |
| *C09K 21/02* | (2006.01) | |

(52) U.S. Cl.
CPC ..... *C08G 73/1082* (2013.01); *C08G 73/1032* (2013.01); *C08G 73/1042* (2013.01); *C08J 5/042* (2013.01); *C08J 5/10* (2013.01); *C08K 3/34* (2013.01); *C09K 21/02* (2013.01); *C08J 2379/08* (2013.01); *C08K 2003/343* (2013.01)

(58) Field of Classification Search
CPC ............ C08G 73/1082; C08G 73/1032; C08G 73/1042; C08G 73/1017; C08J 5/042; C08J 5/10; C08J 2379/08; C08K 3/34; C08K 2201/004; C08K 3/346; C08K 7/06; C08K 9/04; C08K 9/08; C08K 3/04; C09K 21/02; B29B 7/88; B29B 7/90; B29B 9/14; C08L 79/08
USPC .......................................................... 524/451
See application file for complete search history.

(56) References Cited

U.S. PATENT DOCUMENTS

| | | | |
|---|---|---|---|
| 10,174,167 B2 * | 1/2019 | Sato | .................. C08G 73/1075 |
| 2014/0228513 A1 * | 8/2014 | Jeol | .................. C08G 73/1075 |
| | | | 524/600 |
| 2016/0177062 A1 | 6/2016 | Sato et al. | |
| 2016/0185922 A1 * | 6/2016 | Miura | ..................... C08K 7/06 |
| | | | 524/495 |
| 2017/0130003 A1 | 5/2017 | Sato | |
| 2017/0275425 A1 | 9/2017 | Sato | |
| 2018/0355109 A1 | 12/2018 | Jeol et al. | |
| 2022/0332916 A1 * | 10/2022 | Sakai | ................. C08G 73/1017 |

FOREIGN PATENT DOCUMENTS

| | | |
|---|---|---|
| JP | 57-164125 A | 10/1982 |
| JP | 2946510 B2 | 9/1999 |
| JP | 2000-204172 A | 7/2000 |
| JP | 2002-79634 A | 3/2002 |
| JP | 2005-28524 A | 2/2005 |
| JP | 2006-22205 A | 1/2006 |
| JP | 2010-121094 A | 6/2010 |
| JP | 2013-18931 A | 1/2013 |
| JP | 2014-526583 A | 10/2014 |
| JP | 2018-505953 A | 3/2018 |
| WO | WO 2005/068556 A1 | 7/2005 |
| WO | WO 2013/118704 A1 | 8/2013 |
| WO | WO 2015/020020 A1 | 2/2015 |
| WO | WO 2016/147996 A1 | 9/2016 |
| WO | WO 2016/147997 A1 | 9/2016 |
| WO | WO 2019/220967 A1 | 11/2019 |

OTHER PUBLICATIONS

International Search Report issued on Apr. 28, 2020 in PCT/JP2020/007359 filed on Feb. 25, 2020, 3 pages.

* cited by examiner

*Primary Examiner* — Hannah J Pak
(74) *Attorney, Agent, or Firm* — Oblon, McClelland, Maier & Neustadt, L.L.P.

(57) ABSTRACT

A flame-retardant polyimide molding material and a molded article including the flame-retardant polyimide molding material, where the flame-retardant polyimide molding material includes a semi-aromatic polyimide resin (A) and carbon fiber (B), and the flame-retardant polyimide molding material includes 15 to 80 mass % of the carbon fiber (B).

13 Claims, 1 Drawing Sheet

Time (min)

Time (min)

FLAME-RETARDANT POLYIMIDE MOLDING MATERIAL AND MOLDED OBJECT

CROSS-REFERENCE TO RELATED APPLICATIONS

The present application is a 35 U.S.C. § 371 national stage application of International patent application PCT/JP2020/007359, filed Feb. 25, 2020, which is based on and claims the benefit of priority to Japanese Application No. 2019-041766, filed Mar. 7, 2019. The entire contents of these applications are incorporated herein by reference.

TECHNICAL FIELD

The present invention relates to a flame-retardant polyimide molding material and a molded article.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding process ability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

As the thermoplastic polyimide resin, there are known so-called semi-aromatic polyimide resins, which are obtained by a reaction between an aromatic tetracarboxylic acid component and an aliphatic diamine component or a reaction between an aliphatic tetracarboxylic acid component and an aromatic diamine component (e.g., see PTLs 2 and 3). Semi-aromatic polyimide resins, however, tend to be inferior in flame retardancy to total aromatic polyimide resins, which are obtained by a reaction between an aromatic tetracarboxylic acid component and an aromatic diamine component. Semi-aromatic polyimide resins generally have had difficulty in developing high flame retardancy at a V-0 level in the UL94 standard, which is the flame retardant test standard for plastic materials, published by Underwriters Laboratories Inc.

In order to impart flame retardancy to thermoplastic polyimide resins, addition of a flame retardant has been contemplated. For example, PTL 4 discloses an adhesive film in which an adhesive layer containing thermoplastic polyimide and a flame retardant is provided on at least one side of an insulating film.

PTLs 5 and 6 state that a resin composition may be produced by blending an additive such as a flame retardant to a polyimide resin including a predetermined repeating unit.

CITATION LIST

Patent Literature

PTL 1: JP-A-2005-28524
PTL 2: WO2013/118704
PTL 3: JP-A-2014-526583
PTL 4: JP-A-2006-22205
PTL 5: WO2016/147996
PTL 6: WO2016/147997

SUMMARY OF INVENTION

Technical Problem

Resin compositions for use in fields of vehicles, aviation applications, and the like, where flame retardancy at a significant high level is needed, are required to have improved flame retardancy as well as not to be thermally aged even if subjected to a high-temperature condition for a long period and to be excellent in long-term heat resistance.

An object of the present invention is to provide a molded article having good molding processability and having high flame retardancy and long-term heat resistance, and a polyimide molding material from which the molded article may be produced.

Solution to Problem

The present inventors have found that a polyimide molding material containing a semi-aromatic polyimide resin and a specific amount of carbon fiber can solve the above problem.

In other words, the present invention provides a flame-retardant polyimide molding material containing a semi-aromatic polyimide resin (A) and carbon fiber (B), wherein the content of the component (B) is 15 to 80 mass %, and a molded article including the flame-retardant polyimide molding material.

Advantageous Effects of Invention

The flame-retardant polyimide molding material of the present invention is excellent in molding processability as well as can be produced into a molded article having high flame retardancy and long-term heat resistance. The molded article can be applied, for example, in various industrial members, enclosures for industrial machines, members for communication devices, gears, bearings, screws, nuts, packings, IC sockets for inspection, members for household electrical products such as belts and enclosures, covering materials for electrical wire and the like, cover-lay films, members for automobiles, members for railway, members for semiconductor manufacturing apparatuses, aviation applications, medical instruments, enclosures for fishing rods, reels, and the like, stationery, carbon UD tape, and the like. The molded article, which has markedly high strength and modulus of elasticity, can be applied in substitution for various metals including an aluminum alloy and a magnesium alloy. Further, the molded article, which exhibits extremely low volume resistivity as a resin-containing molded article, also can be applied in, for example, antistatic materials, static-dissipative materials, and electromagnetic shielding materials.

DESCRIPTION OF EMBODIMENTS

[Flame-Retardant Polyimide Molding Material]

Figure 1:
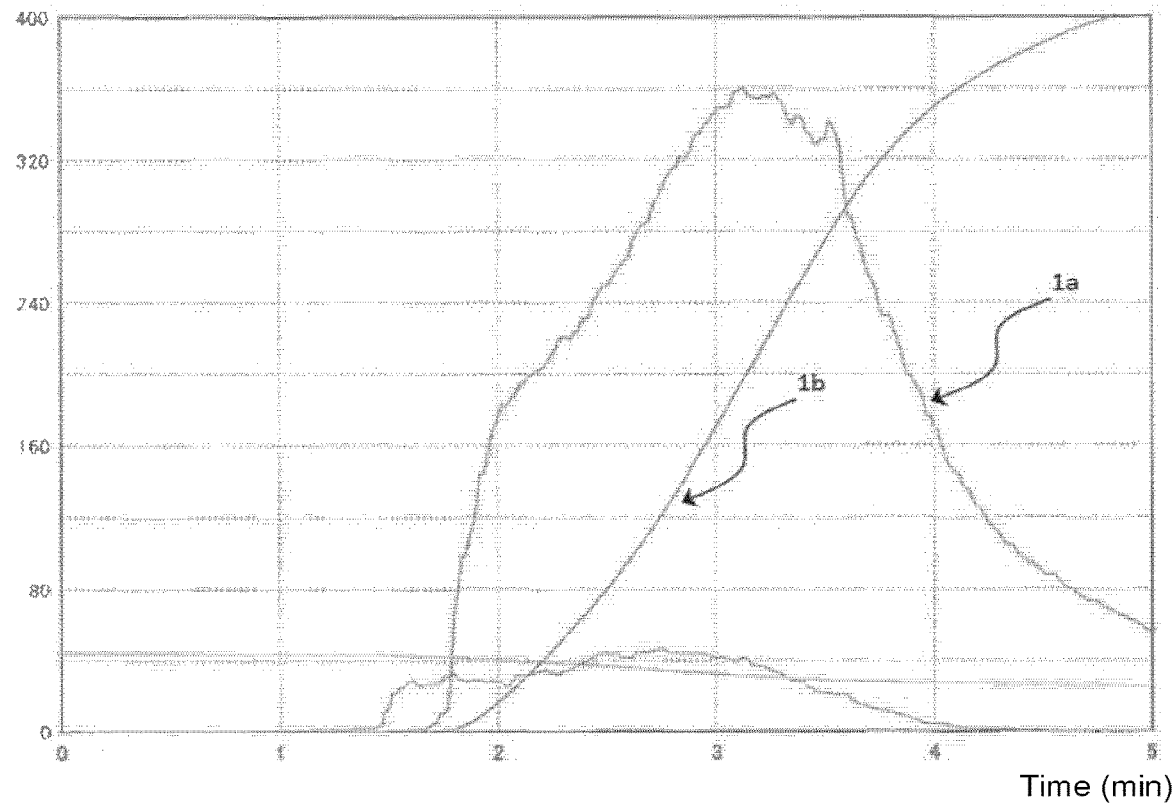
FIG. 1 is a measurement chart of the molded article of Example 4, obtained by a cone calorimeter.

The flame-retardant polyimide molding material of the present invention contains a semi-aromatic polyimide resin (A) and carbon fiber (B), and the content of the component (B) is 15 to 80 mass %.

The flame-retardant polyimide molding material of the present invention exhibits thermoplasticity and relatively high heat resistance to be a material excellent in molding processability because of containing the semi-aromatic polyimide resin (A). Combining the semi-aromatic polyimide resin (A) and a specific amount of the carbon fiber (B) can provide a polyimide molding material and a molded article having high flame retardancy and long-term heat resistance.

While the reason why the above effects are obtained in the flame-retardant polyimide molding material of the present invention has not been clarified, the following may be considered.

A combustion mechanism of a resin material is generally as follows. First, a combustible gas in a combustion atmosphere (gas phase) burns to emit a radiation heat, which raises the temperature of the resin material surface. Next, the temperature of the entire resin material increases due to thermal conduction, and pyrolysis of the resin material, which is organic material, occurs to generate a combustible gas. The generated combustible gas is diffused from the inside of the resin material to the surface (solid phase), then to the gas phase, where the gas combines with oxygen, and the combustion is continued.

An example of a mechanism of flame-retarding the resin material is a method of forming a carbide film (char) on the material surface in the combustion process. When the carbide film is formed on the material surface, the carbide film serves as a combustion barrier layer. This barrier layer interrupts diffusion of the combustible gas generated by pyrolysis of the resin material in the combustion process and ingress of oxygen in the gas phase to achieve flame retardancy. This flame-retarding mechanism is accomplished generally by addition of a flame retardant, for example.

A polyimide resin is known to achieve relatively high flame retardancy even if the resin is used singly. Its flame retarding mechanism is considered as follows.

In the combustion process of the polyimide resin, a radical cleavage reaction of an imide ring in the polyimide resin occurs around 500 to 650° C., and a radical intermediate is formed along with generation of CO and $CO_2$. It is considered that, in the radical intermediate formed at this stage, the imide ring of the polyimide resin is cleaved but the main chain portion is not cut and maintains a polymer chain state. Subsequently, a C—C bond forming reaction between the radical intermediates proceeds to thereby form a carbon precursor having a high molecular weight.

The carbon precursor formed of the semi-aromatic polyimide resin (A) used in the present invention contains an aromatic ring. Thus, it is considered that the carbon precursor is likely to have a graphite structure and to be converted to a carbide film (char) in the combustion process. Further, in the present invention, it is presumed that blending a predetermined amount of the carbon fiber (B) to the semi-aromatic polyimide resin (A) allows formation of a carbide film to efficiently proceed, due to the interaction between the semi-aromatic polyimide resin (A) and the carbon fiber (B) having a high thermal conductivity, to thereby cause high flame retardancy and long-term heat resistance to be exhibited.

Generally, when a filler such as glass fiber is blended to the resin, it is known that the mechanical properties are improved but the flame retardancy is likely to decrease. This is because heat is conducted through the filler on ignition to cause the viscosity of the resin in vicinity of the filler to decrease, a combustion gas is more likely to be generated as decomposition of the resin proceeds, and thus, the combustion is continued. For example, when glass fiber, instead of the carbon fiber (B), is blended to the semi-aromatic polyimide resin (A), a molding material and a molded article to be obtained are excellent in long-term heat resistance but do not exhibit high flame retardancy.

In the present invention, however, surprisingly, it has been found that combination of the semi-aromatic polyimide resin (A) and a specific amount of the carbon fiber (B) can accomplish high flame retardancy, and thus, long-term heat resistance also can be developed.

<Semi-Aromatic Polyimide Resin (A)>

Examples of the semi-aromatic polyimide resin (A) used in the present invention (hereinafter, simply also referred to as the "component (A)") include polyimide resins primarily containing a repeating structural unit derived from an aromatic tetracarboxylic acid component and an aliphatic diamine component and polyimide resins primarily containing a repeating structural unit derived from an aliphatic tetracarboxylic acid component and an aromatic diamine component. The phrase "primarily containing" referred to herein means to contain preferably 50 to 100 mol %, more preferably 75 to 100 mol %, further preferably 80 to 100 mol %, and still further preferably 85 to 100 mol % based on the total repeating structural units derived from the tetracarboxylic acid component and the diamine component constituting the main chain of the polyimide resin.

The component (A) used in the present invention is a thermoplastic resin, which is preferably in a powder or pellet form. The thermoplastic semi-aromatic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

As the component (A) used in present invention, a semi-aromatic polyimide resin primarily containing a repeating structural unit derived from an aromatic tetracarboxylic acid component and an aliphatic diamine component is preferred, from the viewpoint of heat resistance and molding processability. More preferred is a polyimide resin (A1) containing a repeating structural unit represented by the following formula (1) and a repeating structural unit represented by the following formula (2) and having a content ratio of the repeating structural unit of the formula (1) with respect to the total of the repeating structural unit of the formula (1) and the repeating structural unit of the formula (2) of 20 to 70 mol %:

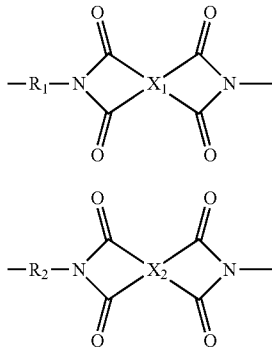

(1)

(2)

wherein $R_1$ represents a divalent aliphatic group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent aromatic group having from 6 to 22 carbon atoms.

Hereinafter, the polyimide resin may be simply also referred to as the "polyimide resin (A1)", the polyimide resin (A1) is taken as an example, and the details will be described.

First, the repeating structural unit of the formula (1) will be described in detail below.

$R_1$ represents a divalent aliphatic group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

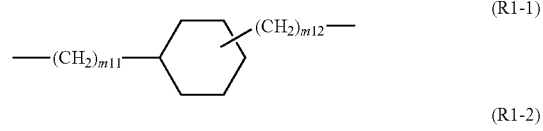

(R1-1)

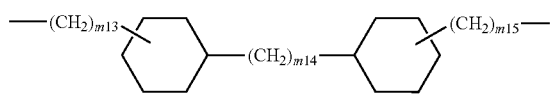

(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

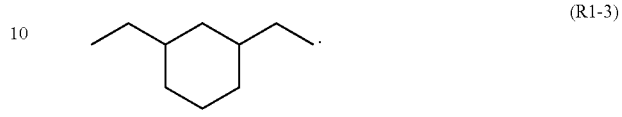

(R1-3)

In the divalent group represented by the formula (R1-3), the conformation of the two methylene groups with respect to the cyclohexane ring may be either cis or trans, and the ratio of cis and trans may be an arbitrary value.

$X_1$ represents a tetravalent aromatic group having from 6 to 22 carbon atoms. The aromatic ring in the aromatic group may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

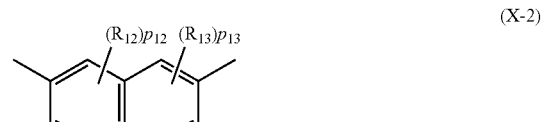

(X-2)

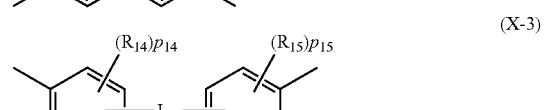

(X-3)

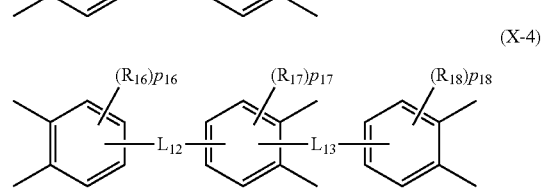

(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent aromatic group having from 6 to 22 carbon atoms and therefore $R_{12}$, $R_{13}$, $p_{12}$, and $p_{13}$ in the formula (X-2) are selected in such a manner that the tetravalent aromatic group represented by the formula (X-2) has from 10 to 22 carbon atoms.

Similarly, $L_{11}$, $R_{14}$, $R_{15}$, $p_{14}$, and $p_{15}$ in the formula (X-3) are selected in such a manner that the tetravalent aromatic group represented by the formula (X-3) has from 12 to 22 carbon atoms, and $L_{12}$, $L_{13}$, $R_{16}$, $R_{17}$, $R_{18}$, $p_{16}$, $p_{17}$, and $p_{18}$ in the formula (X-4) are selected in such a manner that the tetravalent aromatic group represented by the formula (X-4) has from 18 to 22 carbon atoms.

$X_1$ is particularly preferably a tetravalent group represented by the following formula (X-5) or (X-6):

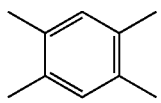

(X-5)

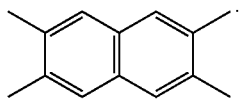

(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of R2 is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

$$—(CH_2)_{m21}—O—(CH_2)_{m22}—$$ (R2-1)

$$—(CH_2)_{m23}—O—(CH_2)_{m24}—O—(CH_2)_{m25}—$$ (R2-2)

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

R2 represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the content ratio falls within this range, the crystallinity of the polyimide resin (A1) increases, and thus, a molding material more excellent in heat resistance can be obtained.

The content ratio described above is preferably 25 mol % or more, more preferably 30 mol % or more, further preferably 32 mol % or more from the viewpoint of molding processability, and is further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A1) is preferably 50 to 100 mol %, more preferably 75 to 100 mol %, further preferably 80 to 100 mol %, and still further preferably 85 to 100 mol %.

The polyimide resin (A1) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

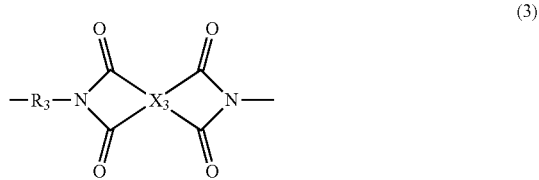

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C(CF$_3$)$_2$— and —(CF$_2$)$_p$— (wherein p is an integer of 1-10)), as well as —CO—, —SO$_2$—, —SO—, —CONH—, and —COO—.

$R_3$ is preferably a divalent group represented by the following formula (R3-1) or (R3-2):

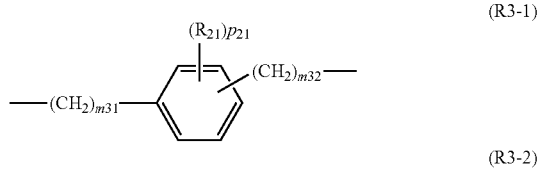

(R3-1)

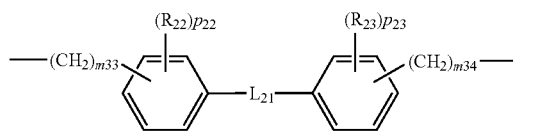

(R3-2)

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A1) may further contain a repeating structural unit represented by the following formula (4):

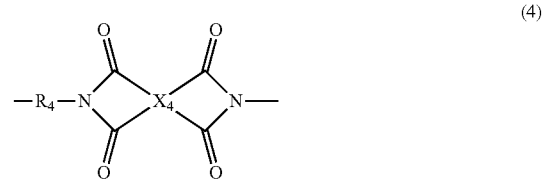

(4)

wherein $R_4$ represents a divalent group containing —SO$_2$— or —Si(R$_x$)(R$_y$)O—; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A1) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A1) contains the above particular group at the end thereof, it is possible to obtain a molded article excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A1) preferably contains only a chain aliphatic group having from 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A1) is preferably 0.01 mol % or more, more preferably 0.1 mol % or more, and further preferably 0.2 mol % or more based on the total 100 mol % of the total repeating structural units constituting the polyimide resin (A1) from the viewpoint of exerting excellent heat aging resistance. In order that a sufficient molecular weight is ensured and good mechanical properties are achieved, the content of the chain aliphatic group having from 5 to 14 carbon atoms in the polyimide resin (A1) is preferably 10 mol % or less, more preferably 6 mol % or less and further preferably 3.5 mol % or less based on the total 100 mol % of the total repeating structural units constituting the polyimide resin (A1).

The content of the chain aliphatic group having from 5 to 14 carbon atoms in the polyimide resin (A1) can be determined by depolymerization of the polyimide resin (A1).

The polyimide resin (A1) preferably has a melting point of 360° C. or less and a glass transition temperature of 150° C. or more. The melting point of the polyimide resin (A1) is more preferably 280° C. or more and further preferably 290° C. or more from the viewpoint of heat resistance, and is preferably 345° C. or less, more preferably 340° C. or less, and further preferably 335° C. or less from the viewpoint of exerting high molding processability. In addition, the glass transition temperature of the polyimide resin (A1) is more preferably 160° C. or more and more preferably 170° C. or more from the viewpoint of heat resistance, and is preferably 250° C. or less, more preferably 230° C. or less, and further preferably 200° C. or less from the viewpoint of exerting high molding processability.

Both the melting point and the glass transition temperature of the polyimide resin (A1) can be measured by a differential scanning calorimeter.

In addition, in the polyimide resin (A1), the exothermic amount (hereinafter, also simply referred to as "exothermic amount of crystallization") of the crystallization exothermic peak observed in melting and then cooling of the polyimide resin (A1) at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization of the polyimide resin (A1) is not particularly limited, and is usually 45.0 mJ/mg or less.

Specifically, the melting point, the glass transition temperature, and the exothermic amount of crystallization of the polyimide resin (A1) can be measured by the methods described in Examples.

The logarithmic viscosity of the polyimide resin (A1) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide molding material obtained has sufficient mechanical strength, and when the logarithmic viscosity is 2.0 dL/g or less, molding processability and handleability are good. The logarithmic viscosity μ is obtained according to the following expression by measuring the elapsed times for flowing concentrated sulfuric acid and the polyimide resin solution at 30° C. with a Cannon-Fenske viscometer.

$$\mu = \ln(t_s/t_0)/C$$

$t_0$: elapsed time for flowing concentrated sulfuric acid
$t_s$: elapsed time for flowing polyimide resin solution
C: 0.5 (g/dL)

The weight average molecular weight Mw of the polyimide resin (A1) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A1) is 10,000 or more, the mechanical strength is good, and when the Mw is 150,000 or less, the molding processability is good.

The weight average molecular weight Mw of the polyimide resin (A1) can be measured by a gel permeation chromatography (GPC) method using polymethyl methacrylate (PMMA) as a standard sample.

(Method for Producing Semi-Aromatic Polyimide Resin (A))

The semi-aromatic polyimide resin (A) may be produced by reacting a tetracarboxylic acid component and a diamine component. Hereinafter, a method for producing the polyimide resin (A1) will be described as an example.

In the production of the polyimide resin (A1), the tetracarboxylic acid component contains an aromatic tetracarboxylic acid and/or a derivative thereof, and the diamine component contains an aliphatic diamine containing at least one alicyclic hydrocarbon structure and a chain aliphatic diamine.

The aromatic tetracarboxylic acid is preferably a compound having four carboxy groups that are bonded directly to the aromatic ring, and may contain an alkyl group in the structure thereof. The aromatic tetracarboxylic acid preferably has from 6 to 26 carbon atoms. Preferred examples of the aromatic tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid, and 1,4,5,8-naphthalenetetracarboxylic acid. Among these, pyromellitic acid is more preferred.

Examples of the derivative of the aromatic tetracarboxylic acid include an anhydride or an alkyl ester compound of an aromatic tetracarboxylic acid. The derivative of the tetracarboxylic acid preferably has from 6 to 38 carbon atoms. Examples of the anhydride of the aromatic tetracarboxylic acid include pyromellitic monoanhydride, pyromellitic dianhydride, toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, and 1,4,5,8-naphthalenetetracarboxylic dianhydride. Examples of the alkyl ester compound of the aromatic tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate, and dimethyl 1,4,5,8-naphthalenetetracarboxylate. The alkyl group in the alkyl ester compound of the aromatic tetracarboxylic acid preferably has from 1 to 3 carbon atoms.

The aromatic tetracarboxylic acid and/or the derivative thereof may be used as a sole compound selected from the aforementioned compounds or may be used as a combination of two or more compounds.

The aliphatic diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane, and 4,4'-diaminodicyclohexylpropane. These compounds may be used solely or may be used as a combination of two or more compounds selected therefrom. Among these, 1,3-bis(aminomethyl)cyclohexane is preferably used. An aliphatic diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A1), the molar ratio of the charged amount of the aliphatic diamine containing at least one alicyclic hydrocarbon structure with respect to the total amount of the aliphatic diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diamino diphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the aliphatic diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin (A1).

In the production of the polyimide resin (A1), the charged amount ratio of the tetracarboxylic acid component and the diamine component is preferably from 0.9 to 1.1 mol of the diamine component per 1 mol of the tetracarboxylic acid component.

In the production of the polyimide resin (A1), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A1), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Among these, the monoamine end capping agent is preferable as the end capping agent, and a monoamine containing a chain aliphatic group having from 5 to 14 carbon atoms is more preferable and a monoamine containing a saturated linear aliphatic group having from 5 to 14 carbon atoms is further preferable from the viewpoint of introduction of the chain aliphatic group having from 5 to 14 carbon atoms into the end of the polyimide resin (A1) for enhancement of heat aging resistance.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the semi-aromatic polyimide resin (A), a known polymerization method may be applied, and the method described in WO2016/147996 may be employed.

<Carbon Fiber (B)>

The flame-retardant polyimide molding material of the present invention contains the semi-aromatic polyimide resin (A) and the carbon fiber (B). When a predetermined amount of the carbon fiber (B) is blended to the semi-aromatic polyimide resin (A), high flame retardancy and long-term heat resistance can be imparted due to the mechanism of action mentioned above, and a molded article also excellent in mechanical properties can be provided.

As the carbon fiber (B), polyacrylonitrile-based carbon fiber or pitch-based carbon fiber is preferably used.

The form of the carbon fiber (B) is not particularly limited. Either of continuous fiber and staple fiber can be used depending on the form of the flame-retardant polyimide molding material and molded article to be obtained, and both the fibers may be used in combination.

The form of the flame-retardant polyimide molding material will be described below. When the flame-retardant polyimide molding material is in the form of pellets, the carbon fiber (B) is preferably staple fiber having an average fiber length of less than 10 mm, from the viewpoint of extrusion moldability and the like. The flame-retardant polyimide molding material also may be in the form of prepreg obtained by impregnating a binder resin containing the semi-aromatic polyimide resin (A) with the carbon fiber (B). The carbon fiber (B) in this case is preferably continuous fiber.

When the carbon fiber (B) is staple fiber, the average fiber length is preferably less than 10 mm, more preferably 0.5 to 8 mm, and further preferably 2 to 8 mm.

When the carbon fiber (B) is continuous fiber, examples of various forms include monofilaments or multifilaments simply arranged in one direction or intercrossed, a fabric, such as a knit fabric, a non-woven fabric, or a mat. Among these, the form of a monofilament, fabric, non-woven fabric, or mat is preferred, and the form of fabric is more preferred.

When the carbon fiber (B) is continuous fiber, the fineness is preferably 20 to 4,500 tex and more preferably 50 to 4,000 tex. When the fineness falls within this range, impregnation of the semi-aromatic polyimide resin (A) is easy, and the resulting molded article is excellent in modulus of elasticity and strength. The fineness may be determined in terms of weight per 1,000 m by determining the weight of the continuous fiber having an arbitrary length.

The average fiber diameter of the carbon fiber (B) is preferably 1 to 100 μm, more preferably 3 to 50 μm, and further preferably 4 to 20 μm. When the average fiber diameter is in the range, processing is easy and the resulting molded article is excellent in modulus of elasticity and strength.

The average fiber length of the carbon fiber (staple fiber) and the average fiber diameter of the carbon fiber can be determined as follows: the carbon fiber is observed under a scanning electron microscope (SEM) or the like, 50 or more fibers are selected at random, their lengths or diameters are measured, and a number average fiber length or fiber diameter is calculated.

The carbon fiber (B) usually has filaments in the range of 500 to 100,000, preferably 5,000 to 80,000, and more preferably 10,000 to 70,000.

The carbon fiber (B) is preferably surface-treated with a surface treatment agent in order to enhance wettability and interface adherence with the semi-aromatic polyimide resin (A). The concept of the surface treatment agent also include a bundling agent and a sizing agent.

Examples of the surface treatment agent include an epoxy-based material, a urethane-based material, an acryl-based material, a polyamide-based material, a polyester-based material, a vinyl ester-based material, a polyolefin-based material, and a polyether-based material. These can each be used alone or can be used in combinations of two or more thereof. An epoxy-based material is preferred as the surface treatment agent in consideration that the higher mechanical properties and high flame retardancy are both achieved.

A treatment amount of the carbon fiber (B) by the surface treatment agent can be appropriately selected depending on the type of surface treatment agent, the form of carbon fiber, and the like. For example, when staple fiber is used as the carbon fiber (B), staple fiber surface-treated by a sizing agent is preferred in consideration that the dispersibility in the semi-aromatic polyimide resin (A) is enhanced and higher flame retardancy is achieved. The amount of the sizing agent attached is preferably in the range of 1.5 to 10 mass % and more preferably in the range of 2 to 5 mass %.

Commercially available carbon fiber may be used as the carbon fiber (B). Examples of commercially available carbon fiber (staple fiber) include Chopped Fiber "CFUW", "CFEPP", "CFEPU", "CFA4", "FX1", "EX1", "BF-WS", "CF-N", and "VX1" series produced by Nippon Polymer Sangyo Co., Ltd.; PYROFIL Chopped Fiber "TR06U", "TR06NE", "TR066A", and "TR06UL" series produced by Mitsubishi Chemical Corporation; and "IM-C702", "HT C702", "HT P722" produced by TEIJIN LIMITED.

The content of the carbon fiber (B) in the flame-retardant polyimide molding material is 15 to 80 mass %, preferably 20 to 70 mass %, more preferably 25 to 65 mass %, further preferably 25 to 60 mass %, still further preferably 30 to 55 mass %, and still further preferably 30 to 50 mass %. When the content of the carbon fiber (B) in the flame-retardant polyimide molding material is 15 mass % or more, a molded article having high flame retardancy, long-term heat resistance, and mechanical properties can be obtained. When the content is 80 mass % or less, molding processability is good.

<Additives and the Like>

In the flame-retardant polyimide molding material of the present invention, additives may be mixed as required, such as a delusterant, a nucleating agent, a plasticizer, an antistatic agent, an anti-coloring agent, an anti-gelling agent, a colorant, a slidability-improving agent, an antioxidant, a conducting agent, a resin-modifying agent, and a filler other than the carbon fiber (B).

The amount of the above additive mixed is not particularly limited, and usually 50 mass % or less, preferably 0.0001 to 30 mass %, more preferably 0.001 to 15 mass %, and further preferably 0.01 to 10 mass % in the flame-retardant polyimide molding material in consideration that the effect of the additive is exerted without compromising the effect of the present invention.

The flame-retardant polyimide molding material of the present invention can achieve high flame retardancy and long-term heat resistance even if not containing an existing flame retardant, and thus, a smaller flame retardant content is preferred. For example, the flame retardant content in the flame-retardant polyimide molding material of the present invention is preferably 5 mass % or less, more preferably 2 mass % or less, further preferably 1 mass % or less, and still further preferably 0.1 mass % or less.

Examples of an existing flame retardant include a halogen-based flame retardant, a phosphorus-based flame retardant, a metal oxide-based flame retardant, a metal hydroxide-based flame retardant, a metal salt-based flame retardant, a nitrogen-based flame retardant, a silicone-based flame retardant, and a boron compound-based flame retardant.

From the viewpoint of avoiding degradation of the appearance of the molded article due to bleedout of the flame retardant, increase in outgassing under high temperatures, decrease in the mechanical strength, contamination of the equipment such as a mold, and the like, the flame-retardant polyimide molding material of the present invention more preferably does not contain the above flame retardant.

Another resin other than the semi-aromatic polyimide resin (A) may also be mixed in the flame-retardant polyimide resin molding material of the present invention, without impairing the characteristics of the molding material. Examples of the resin include a polyamide resin, a polyester resin, a polyimide resin other than the polyimide resin (A), a polycarbonate resin, a polyetherimide resin, a polyamide-imide resin, a polyphenylene ether imide resin, a polyphenylene sulfide resin, a polysulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more flame-retardant thermoplastic resins selected from the group consisting of a polyetherimide resin, a polyphenylene sulfide resin, and a polyether ether ketone resin are preferable, and a polyphenylene sulfide resin is more preferable from the viewpoint of achievement of high flame retardancy. When a resin other than the semi-aromatic polyimide resin (A) is combined, the rate of the resin to be mixed is not particularly limited, without impairing the characteristics of the flame-retardant polyimide resin molding material.

However, the total content of the semi-aromatic polyimide resin (A) and the carbon fiber (B) in the flame-retardant polyimide molding material of the present invention is preferably 50 mass % or more, more preferably 70 mass % or more, further preferably 80 mass % or more, and still further preferably 90 mass % or more from the viewpoint of achievement of the effect of the present invention. The upper limit thereof is 100 mass %.

The flame-retardant polyimide molding material of the present invention may have any form, and for example, may be pellets containing the semi-aromatic polyimide resin (A) and the carbon fiber (B) or may have a form of prepreg obtained by impregnating a binder resin containing the semi-aromatic polyimide resin (A) with the carbon fiber (B).

The flame-retardant polyimide molding material of the present invention is preferably pellets in consideration that the flame-retardant polyimide molding material of the present invention is subjected to extrusion molding to produce a molded article.

Pellets made of the flame-retardant polyimide molding material can be obtained by, for example, adding and dry blending the semi-aromatic polyimide resin (A), the carbon fiber (B), and various arbitrary components, if necessary, thereafter, melt-kneading the blend in an extruder, extruding the melt-kneaded product into a strand, and cutting the strand. The pellets are introduced in various kinds of molding machines and heat-molded by a method described below, thereby being easily produced into a molded article having a desired shape.

<Flame Retardancy>

The flame-retardant polyimide molding material of the present invention has high flame retardancy. Specifically, in the present invention, a 4-mm thick molded article made of the flame-retardant polyimide molding material can have flame retardancy corresponding to V-0 in a flame retardant test according to the UL94 standard. Specifically, the flame retardancy may be evaluated in accordance with the method described in Examples.

A molded article of 100 mm×100 mm×3 mm in thickness made of the flame-retardant polyimide molding material of the present invention preferably has a maximum exothermic rate of 450 kW/m$^2$ or less, as measured with a cone calorimeter at an amount of radiant heat of 50 kW/m$^2$ according to the ISO 5660-1 standard. The maximum exothermic rate means the maximum value of the exothermic rate measured within 0 to 5 minutes after start of the measurement when the molded article is heated with a cone calorimeter at an amount of radiant heat of 50 kW/m$^2$.

When the maximum exothermic rate value is 450 kW/m$^2$ or less, high flame retardancy can be achieved. The maximum exothermic rate is more preferably 420 kW/m$^2$ or less and further preferably 400 kW/m$^2$ or less.

The molded article of 100 mm×100 mm×3 mm in thickness made of the flame-retardant polyimide molding material of the present invention has a total exothermic amount from 0 to 5 minutes after start of the measurement, as measured with a cone calorimeter under the above conditions, of preferably 70 MJ/m$^2$ or less, more preferably 65 MJ/m$^2$ or less, and further preferably 60 MJ/m$^2$ or less from the viewpoint of achievement of high flame retardancy.

Specifically, the maximum exothermic rate and total exothermic amount can be measured by the method described in Examples.

<Other Properties>

The flame-retardant polyimide molding material of the present invention and a molded article including the molding material have high flame retardancy and long-term heat resistance and additionally have high strength and a high modulus of elasticity.

Further, the flame-retardant polyimide molding material of the present invention and the molded article including the molding material exhibit extremely low volume resistivity for a molding material and a molded article containing a resin. Specifically, the volume resistivity of a 4-mm thick molded article made of the flame-retardant polyimide molding material of the present invention, as measured under conditions of 23° C. and 50% R.H. according to ASTM D991 (four-terminal method), may be, for example, in the range of $1 \times 10^3$ Ω·cm or less, preferably $5 \times 10^2$ Ω·cm or less, more preferably $1 \times 10^{-3}$ to $1 \times 10^2$ Ω·cm, and further preferably $1 \times 10^{-3}$ to $1 \times 10^1$ Ω·cm.

Specifically, the volume resistivity may be measured by the method described in Examples.

[Molded Article]

The present invention provides a molded article including the flame-retardant polyimide molding material.

Since the flame-retardant polyimide molding material of the present invention has thermoplasticity derived from the semi-aromatic polyimide resin (A), the molded article of the present invention can be easily produced by heat-molding the molding material. Examples of the heat molding method include injection molding, extrusion molding, sheet extrusion molding, blow molding, heat press molding, vacuum molding, pneumatic molding, laser molding, insert molding, welding, and heat adhesion, and the molding material may be molded by any molding method that includes a heat melting step. Among these, injection molding is preferable because molding is enabled without setting the molding temperature to an elevated temperature more than 400° C., for example.

The method for producing a molded article preferably includes the step of heat-molding the flame-retardant polyimide molding material. Examples of specific procedures when staple fiber is used as the carbon fiber (B) include the following method.

First, various arbitrary components are, if necessary, added to the semi-aromatic polyimide resin (A) and dry blended, and thereafter the resulting mixture is introduced into an extruder and molten. Then, the carbon fiber (B) is side-fed thereto, the mixture is melt-kneaded in the extruder and extruded, thereby producing pellets. Alternatively, the semi-aromatic polyimide resin (A) may be introduced into an extruder and molten, the carbon fiber (B) and various arbitrary components may be side-fed thereto, and the mixture is melt-kneaded with the semi-aromatic polyimide resin (A) in the extruder and extruded, thereby producing the pellets.

The pellets may be dried, then introduced in various kinds of molding machines, and heat-molded, thereby producing a molded article having a desired shape.

Since the flame-retardant polyimide molding material of the present invention may be heat-molded by extrusion molding or the like at a temperature of 400° C. or less, the molding material is excellent in molding processability and may be easily produced into a molded product having a desired shape.

The molded article of the present invention also include a molded article of which a portion is composed of the flame-retardant polyimide molding material of the present invention. In a preferred aspect of the molded article of the present invention, at least the surface of the molded article is preferably composed of the flame-retardant polyimide molding material of the present invention from the viewpoint of flame retardancy. Accordingly, for example, a molded article may be produced using the flame-retardant polyimide molding material of the present invention and a thermoplastic resin other than the molding material by insert molding or the like.

The flame-retardant polyimide molding material of the present invention is excellent in molding processability as well as can be produced into a molded article having high flame retardancy and long-term heat resistance. The molded article can be applied, for example, in various industrial members, enclosures for industrial machines, members for communication devices, gears, bearings, screws, nuts, packings, IC sockets for inspection, members for household electrical products such as belts and enclosures, covering materials for electrical wire and the like, cover-lay films, members for automobiles, members for railway, members for semiconductor manufacturing apparatuses, aviation applications, medical instruments, enclosures for fishing rods, reels, and the like, stationery, carbon UD tape, and the like. The molded article, which has markedly high strength and modulus of elasticity, can be applied in substitution for various metals including an aluminum alloy and a magnesium alloy. Further, the molded article, which exhibits extremely low volume resistivity as a resin-containing molded article, also can be applied in, for example, antistatic materials, static-dissipative materials, and electromagnetic shielding materials.

EXAMPLES

The present invention will be described in more detail with reference to examples below, but the present invention is not limited thereto. Various measurements and evaluations in each Production Example, Example, and Comparative Example were carried out in the following manners.

<Infrared Spectroscopy (IR Measurement)>
The IR measurement of the polyimide resin was performed with "JIR-WINSPEC 50", produced by JEOL, Ltd.
<Logarithmic Viscosity μ>
The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$\mu = \ln(ts/t_0)/C$ $t_0$: elapsed time for flowing concentrated sulfuric acid
ts: elapsed time for flowing polyimide resin solution
C: 0.5 g/dL
<Melting Point, Glass Transition Temperature, Crystallization Temperature, and Exothermic Amount of Crystallization>

The melting point (Tm), the glass transition temperature (Tg), the crystallization temperature (Tc) and the exothermic amount of crystallization (ΔHm) of the polyimide resin were measured with a differential scanning calorimeter ("DSC-6220", produced by SII Nanotechnology, Inc.).

The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.
<Crystallization Half-Time>

The crystallization half-time of the polyimide resin was measured with a differential scanning calorimeter ("DSC-6220", produced by SII Nanotechnology, Inc.).

Under a nitrogen atmosphere, a polyimide resin was held at 420° C. for 10 minutes for melting the polyimide resin completely and then quenched at a cooling rate of 70° C./min, during which the time required from the appearance of the crystallization peak observed to the peak top thereof was calculated. In Table 1, the case where the crystallization half-time was 20 seconds or less was denoted by "<20".
<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:
Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Bending Strength and Flexural Modulus>

The polyimide molding material produced in each Example was used to prepare a molded article of 80 mm×10 mm×4 mm in thickness prescribed in ISO 316 by the method described below, which was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

<Tensile Strength and Tensile Modulus>

The polyimide molding material produced in each Example was used to prepare a 1A-type specimen prescribed in JIS K7161-2:2014 by the method described below, which was used for measurement. The tensile test was performed with a tensile testing machine ("Strograph VG-1E" produced by Toyo Seiki Seisaku-Sho, Ltd.) according to JIS K7161-1:2014 and K7161-2:2014 at a temperature of 23° C., a distance between chucks of 50 mm, and a testing speed of 20 mm/min to measure the tensile strength and the tensile modulus.

<Heat Deformation Temperature (HDT)>

The polyimide molding material produced in each Example was used to prepare a molded article of 80 mm×10 mm×4 mm in thickness by the method described below, which was used for measurement. A HDT tester "Auto-HDT3D-2" (produced by Toyo Seiki Seisaku-sho, Ltd.) was used to measure the heat deformation temperature under conditions including a distance between supports of 64 mm, a load of 1.80 MPa, and a heating rate of 120° C./hour.

<Melt Flow Rate (MFR)>

The polyimide molding material produced in each Example was used for measurement of the MFR (g/10 min) at a temperature of 360° C. and under a load of 2.16 kgf according to JIS K7210-1:2014.

A commercially available carbon fiber reinforced resin for injection molding ("PEEK 450CA30" produced by Victrex plc) obtained by filling a polyether ether ketone resin ("PEEK 450" produced by Victrex plc) with carbon fiber at 30 mass % has a MFR measured under the same conditions of 0.23 g/10 min. When the value was larger than this MFR, the molding material was evaluated as having good flowability suitable for injection molding.

<Spiral Flow Length>

Pellets made of the polyimide molding material produced in each Example were dried at 150° C. for 8 hours and used for evaluation. The pellets were injection molded using a spiral flow mold (spiral width: 5 mm, spiral thickness: 3 mm) in a hybrid-type injection molding machine "PNX60" produced by NISSEI PLASTIC INDUSTRIAL CO., LTD. at a barrel temperature of 355° C., a mold temperature of 180° C., and injection pressures of 100 MPa and 150 MPa, during which the spiral flow length was measured.

The above commercially available carbon fiber reinforced resin ("SUMIPLOY CK4600" produced by Sumitomo Chemical Co., Ltd.) had a spiral flow length measured under the same conditions of 6.4 cm at an injection pressure of 100 MPa and 7.5 cm at 150 MPa. When the value was larger than these lengths, the molding material was evaluated as having good flowability suitable for injection molding.

<UL94 Flammability Test>

The polyimide molding material produced in each Example was used to prepare a molded article of 80 mm×10 mm×4 mm in thickness by the method described below. The above molded article was used to conduct a flammability test (n=5) by a vertical burning test method according to the UL94 standard, which is the flame retardant test standard for plastic materials published by Underwriters Laboratories Inc., and the rank of flame retardancy (V-0, V-1, V-2) was evaluated. The flame retardancy becomes higher in the order of the flame retardancy ranks V-0, V-1, and V-2. A molded article of which the flame retardancy did not reach V-2 was evaluated as "non-conforming".

<Total Flaming Time>

The total flaming time (unit: seconds) of the first and second flammability test runs among n=5 in the above UL94 flammability test is shown in Table 2. A molded article of which the total flaming time exceeded 30 seconds was denoted by ">30".

<Maximum Exothermic Rate, Total Exothermic Amount, and Ignition Time>

The polyimide molding material produced in each Example was used to prepare a molded article of 100 mm×100 mm×3 mm in thickness by the method described below, which was used for measurement. The measurement was conducted with a cone calorimeter "Cone calorimeter C4" produced by Toyo Seiki Seisaku-Sho, Ltd. according to the ISO 5660-1 standard at an amount of radiant heat 50 kW/m$^2$. The maximum value of the exothermic rate measured within 0 to 5 minutes after start of the measurement, the total exothermic amount from 0 to 5 minutes after start of the measurement, and the ignition time were measured.

<Bending Strength Retention and Flexural Modulus Retention>

The polyimide molding material produced in each Example was used to prepare a molded article of 80 mm×10 mm×4 mm in thickness prescribed in ISO 316 by the method described below. After the molded article was stored in a constant temperature chamber ("SPHH-101" produced by ESPEC Corp.) at 200° C. for 2 weeks, the bending strength and the flexural modulus were measured according to the same method as described above.

The bending strength retention and the flexural modulus retention were determined by the following expressions. A higher retention means that the molded article is more excellent in long-term heat resistance.

Bending strength retention (%)=(bending strength of molded article after storage for 2 weeks at 200° C./bending strength of molded article immediately after preparation)×100

Flexural modulus retention (%)=(flexural modulus of molded article after storage for 2 weeks at 200° C./flexural modulus of molded article immediately after preparation)×100

<Long-Term Heat Resistance: Tensile Strength, Tensile Modulus, and Tensile Strength Retention>

The polyimide molding material produced in each of Examples 2 and 4 and Comparative Examples 1 and 3 was used to prepare a 1A-type specimen prescribed in JIS K7161-2:2014 by the method described below. After the specimen was stored in a constant temperature chamber ("SPHH-101" produced by ESPEC Corp.) at 180° C. or 200° C. for a period shown in Table 3 (1 week, 2 weeks, 4 weeks, and 125 days), the bending strength and the flexural modulus were measured according to the same method as described above.

The tensile strength retention was determined by the following expression. A higher retention means that the molded article is more excellent in long-term heat resistance.

Tensile strength retention (%)=(tensile strength of specimen stored at predetermined temperature for predetermined period/tensile strength of specimen immediately after preparation)×100

<Thermal Conductivity>
(Measurement at 25° C.)

The polyimide molding material produced in each Example was used to prepare a molded article of 70 mm×70 mm×3 mm in thickness by the method described below. The molded article was cut from the center portion thereof to prepare a specimen of 50 mm in diameter, which was used for measurement. The thermal conductivity at 25° C. was measured with a thermal conductivity meter ("DTC-300" produced by TA Instruments Japan Inc.) according to ASTM E1530 (disk heat flow meter method).

(Measurement at 150° C.)

Pellets made of the polyimide molding material produced in each Example were used for measurement. The thermal conductivity at 150° C. was measured with a thermal conductivity meter ("LS-1" produced by Toyo Seiki Seisaku-sho, Ltd.).

<Volume Resistivity>

In Examples 1 to 5, the polyimide molding material produced in each Example was used to prepare a molded article of 175 mm×10 mm×4 mm in thickness by the method described below. The molded article was subjected to humidity control at 23° C. and 50% R.H. for 48 hours or more and then used for measurement. The volume resistivity at 23° C. and 50% R.H. was measured with a "Digital Ohm Meter R-506" produced by Kawaguchi Electric Works according to ASTM D991 (four-terminal method).

In Comparative Examples 1 and 3, the polyimide molding material produced in each Comparative Example was used to prepare a molded article of 70 mm×70 mm×3 mm in thickness by the method described below. The molded article was dried at 150° C. for 3 hours and then used for measurement. The volume resistivity at 23° C. and 50% R.H. with a voltage of 500 V applied for 1 minute using a "High Resistance Meter 4339B" produced by Agilent Technologies Japan, Ltd. according to IEC:60093. The average value of n=2 was taken as the measurement value in any of the Examples and Comparative Examples.

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl)cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring $v(C=O)$ observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of the polyimide resin in Production Example 1 are shown in Table 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in total tetracarboxylic acid components) | Diamine component (mol % in total diamine components) | | (1)/[(1) + (2)] | Tm | Tg | Tc | Exothermic amount of crystallization ΔHm | Crystallization half-time | |
|---|---|---|---|---|---|---|---|---|---|---|---|
| | | PMDA | 1,3-BAC | OMDA | (mol %)*1 | (° C.) | (° C.) | (° C.) | (mJ/mg) | (seconds) | Mw |
| Production Example 1 | Polyimide resin 1 | 100 | 35 | 65 | 35 | 323 | 184 | 266 | 21.0 | <20 | 55,000 |

*1 The content ratio of the repeating structural unit of the formula (1) (mol %) with respect to the total of the repeating structural unit of the formula (1) and the repeating structural unit of the formula (2) in the polyimide resin 1

Abbreviations in the Table 1 are as follows.
PMDA; pyromellitic dianhydride
1,3-BAC; 1,3-bis(aminomethyl)cyclohexane
OMDA; 1,8-octamethylenediamine Examples 1 to 13 and Comparative Examples 1 to 3 (Production and evaluation of polyimide molding material)

Examples 1 to 13 and Comparative Examples 2 and 3

The polyimide resin 1 obtained in Production Example 1 and talc in an amount shown in Table 2 were sufficiently mixed by dry blend. Into a co-rotating twin-screw kneading extruder ("HK-25D" produced by Parker Corporation, screw diameter: 25 mm, L/D=41), the resulting mixed powder was loaded at a feed rate of 3.5 kg/hour via the hopper. On the other hand, carbon fiber (B) or glass fiber in the amount to achieve the ratio shown in Table 2 was loaded via the side feeder. The kneaded product was extruded at a barrel temperature of 330 to 335° C. and a screw rotation speed of 150 rpm. A strand extruded from the extruder was cooled in air and then pelletized with a pelletizer ("Fan Cutter FC-Mini-4/N", produced by Hoshi Plastic Co., Ltd.). The resulting pellets were dried at 150° C. for 12 hours and then used in injection molding.

The injection molding was performed at a barrel temperature of 385° C., a mold temperature of 200° C., and a molding cycle of 60 seconds with an injection molding machine ("ROBOSHOT α-S30iA", produced by FANUC CORPORATION), thereby preparing a molded article of a predetermined shape to be used for various evaluations.

The obtained molded article was used to perform various evaluations according to the methods mentioned above. The results are shown in Table 2 and Table 3.

Comparative Example 1

The polyimide resin 1 obtained in Production Example 1 was extruded at a barrel temperature of 350° C. and a screw rotation speed of 70 rpm with Labo Plastomill (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.). The resulting pellets were dried at 150° C. for 12 hours and then used in injection molding.

The injection molding was performed at a barrel temperature of 350° C., a mold temperature of 200° C., and a molding cycle of 50 seconds with an injection molding machine ("ROBOSHOT α-S30iA", produced by FANUC CORPORATION), thereby preparing a molded article of a predetermined shape to be used for various evaluations.

The obtained pellets or molded article was used to perform various evaluations mentioned above. The results are shown in Table 2 and Table 3.

TABLE 2

| | | | | | Example | | | | | | |
|---|---|---|---|---|---|---|---|---|---|---|---|
| | | | | | 1 | 2 | 3 | 4 | 5 | 6 | 7 |
| Molding material blend (mass %) | (A) | (A1) Polyimide resin 1 | | | 79.2 | 69.3 | 59.4 | 49.5 | 39.6 | 49.5 | 49.5 |
| | (B) | (B1) EX1-MC | | | 20 | 30 | 40 | 50 | 60 | | |
| | | (B2) CFUW-MC | | | | | | | | 50 | |
| | | (B3) TR06U B4E | | | | | | | | | 50 |
| | | (B4) TR06NE B4E | | | | | | | | | |
| | | (B5) TR066A B4E | | | | | | | | | |
| | | (B6) TR06UL B6R | | | | | | | | | |
| | | (B7) TR06UL B5R | | | | | | | | | |
| | | (B8) CF-N | | | | | | | | | |
| | Others | Talc D-800 | | | 0.8 | 0.7 | 0.6 | 0.5 | 0.4 | 0.5 | 0.5 |
| | | Glass fiber T-786H | | | | | | | | | |
| Evaluation results | Mechanical physical properties | Bending strength | MPa | | 295 | 329 | 334 | 334 | 284 | 283 | 292 |
| | | Flexural modulus | GPa | | 14.2 | 20.5 | 26.8 | 34.5 | 41.5 | 33.0 | 31.6 |
| | HDT | High load (1.80 MPa) | ° C. | | 286 | 291 | 293 | 294 | | 289 | 290 |
| | Flowability | MFR (360° C., 2.16 kgf) | g/10 min | | | | | 1.49 | | | |
| | | Spiral flow length (355° C., 100 MPa) | cm | | | | | 11.5 | | | |
| | | Spiral flow length (355° C., 150 MPa) | cm | | | | | 13.2 | | | |

TABLE 2-continued

|  |  |  |  |  |  |  |  |  |  |
|---|---|---|---|---|---|---|---|---|---|
| Flammability | UL94 flammability test (thickness: 4 mm) | — | V-1 | V-0 | V-0 | V-0 | V-0 | V-0 | V-0 |
|  | Total flaming time (n = 2) | sec | 15 | 0 | 0 | 0 | 0 | 0 | 19 |
|  | Maximum exothermic rate | kW/m² | 338 | 331 | 376 | 360 |  |  |  |
|  | Total exothermic amount | MJ/m² | 63 | 56 | 51 | 41 |  |  |  |
|  | Ignition time | sec | 55 | 50 | 41 | 84 |  |  |  |
| Long-term heat resistance | Bending strength retention (200° C. 2 w) | % | 82 | 84 | 95 | 90 |  | 96 | 96 |
|  | Flexural modulus retention (200° C. 2 w) | % | 103 | 102 | 102 | 103 |  | 101 | 100 |
| thermal conductance | Thermal conductivity (25° C.) | W/(m·K) |  | 0.30 |  | 0.68 |  |  |  |
|  | Thermal conductivity (150° C.) | W/(m·K) |  | 0.48 |  | 0.77 |  |  |  |
| Electrical properties | Volume resistivity | Ω·cm | $4.6 \times 10^1$ | 8.0 | $9.5 \times 10^{-1}$ | $3.7 \times 10^{-1}$ | $1.5 \times 10^{-1}$ |  |  |

|  |  |  |  | Example | | | | | |
|---|---|---|---|---|---|---|---|---|---|
|  |  |  |  | 8 | 9 | 10 | 11 | 12 | 13 |
| Molding material blend (mass %) | (A) | (A1) Polyimide resin 1 |  | 49.5 | 49.5 | 49.5 | 49.5 | 69.5 | 49.5 |
|  | (B) | (B1) EX1-MC |  |  |  |  |  |  |  |
|  |  | (B2) CFUW-MC |  |  |  |  |  |  |  |
|  |  | (B3) TR06U B4E |  |  |  |  |  |  |  |
|  |  | (B4) TR06NE B4E |  | 50 |  |  |  |  |  |
|  |  | (B5) TR066A B4E |  |  | 50 |  |  |  |  |
|  |  | (B6) TR06UL B6R |  |  |  | 50 |  |  |  |
|  |  | (B7) TR06UL B5R |  |  |  |  | 50 |  |  |
|  |  | (B8) CF-N |  |  |  |  |  | 30 | 50 |
|  | Others | Talc D-800 |  | 0.5 | 0.5 | 0.5 | 05 | 0.5 | 0.5 |
|  |  | Glass fiber T-786H |  |  |  |  |  |  |  |
| Evaluation results | Mechanical physical properties | Bending strength | MPa | 297 | 280 | 330 | 293 | 210 | 257 |
|  |  | Flexural modulus | GPa | 30.0 | 29.4 | 33.9 | 31.6 | 18.1 | 30.2 |
|  | HDT | High load (1.80 MPa) | ° C. | 291 | 289 | 293 | 290 |  |  |
|  | Flowability | MFR (360° C., 2.16 kgf) | g/10 min |  |  |  |  |  |  |
|  |  | Spiral flow length (355° C., 100 MPa) | cm |  |  |  |  |  |  |
|  |  | Spiral flow length (355° C., 150 MPa) | cm |  |  |  |  |  |  |
|  | Flammability | UL94 flammability test (thickness: 4 mm) | — | V-0 | V-0 | V-0 | V-0 | V-1 | V-0 |
|  |  | Total flaming time (n = 2) | sec | 0 | 14 | 9 | 12 | 31 | 13 |
|  |  | Maximum exothermic rate | kW/m² |  |  |  |  |  |  |
|  |  | Total exothermic amount | MJ/m² |  |  |  |  |  |  |
|  |  | Ignition time | sec |  |  |  |  |  |  |
|  | Long-term heat resistance | Bending strength retention (200° C. 2 w) | % | 98 | 99 | 93 | 97 |  |  |
|  |  | Flexural modulus retention (200° C. 2 w) | % | 102 | 101 | 101 | 104 |  |  |
|  | thermal conductance | Thermal conductivity (25° C.) | W/(m·K) |  |  |  |  |  |  |
|  |  | Thermal conductivity (150° C.) | W/(m·K) |  |  |  |  |  |  |
|  | Electrical properties | Volume resistivity | Ω·cm |  |  |  |  |  |  |

TABLE 2-continued

|  |  |  |  | Comparative Example | | |
|---|---|---|---|---|---|---|
|  |  |  |  | 1 | 2 | 3 |
| Molding material blend (mass %) | (A) | (A1) Polyimide resin 1 |  | 100 | 89.1 | 49.5 |
|  | (B) | (B1) EX1-MC |  |  | 10 |  |
|  |  | (B2) CFUW-MC |  |  |  |  |
|  |  | (B3) TR06U B4E |  |  |  |  |
|  |  | (B4) TR06NE B4E |  |  |  |  |
|  |  | (B5) TR066A B4E |  |  |  |  |
|  |  | (B6) TR06UL B6R |  |  |  |  |
|  |  | (B7) TR06UL B5R |  |  |  |  |
|  |  | (B8) CF-N |  |  |  |  |
|  | Others | Talc D-800 |  |  | 0.9 | 0.5 |
|  |  | Glass fiber T-786H |  |  |  | 50 |
| Evaluation results | Mechanical physical properties | Bending strength | MPa | 120 | 237 | 256 |
|  |  | Flexural modulus | GPa | 2.7 | 8.3 | 15.0 |
|  | HDT | High load (1.80 MPa) | °C. | 170 | 259 | 291 |
|  | Flowability | MFR (360° C., 2.16 kgf) | g/10 min | 4.80 |  | 1.72 |
|  |  | Spiral flow length (355° C., 100 MPa) | cm | 27.7 |  | 15.5 |
|  |  | Spiral flow length (355° C., 150 MPa) | cm | 31.3 |  | 18.1 |
|  | Flammability | UL94 flammability test (thickness: 4 mm) |  | — | V-2 | Non-conforming | Non-conforming |
|  |  | Total flaming time (n = 2) | sec | — | >30 | >30 |
|  |  | Maximum exothermic rate | kW/m² | 753 | 471 |  |
|  |  | Total exothermic amount | MJ/m² | 78 | 73 |  |
|  |  | Ignition time | sec | 66 | 51 |  |
|  | Long-term heat resistance | Bending strength retention (200° C. 2 w) | % | 27 | 73 | 86 |
|  |  | Flexural modulus retention (200° C. 2 w) | % | 116 | 103 | 102 |
|  | thermal conductance | Thermal conductivity (25° C.) | W/(m · K) | 0.27 |  | 0.30 |
|  |  | Thermal conductivity (150° C.) | W/(m · K) | 0.34 |  | 0.40 |
|  | Electrical properties | Volume resistivity | Ω · cm | $5.3 \times 10^{17}$ |  | $3.4 \times 10^{16}$ |

*: A cell with a slash means no measurement was conducted.

TABLE 3

|  |  |  | Example | | Comparative Example | |
|---|---|---|---|---|---|---|
|  |  |  | 2 | 4 | 1 | 3 |
| Molding material blend (mass %) | (A) | (A1) Polyimide resin 1 | 69.3 | 49.5 | 100 | 49.5 |
|  | (B) | (B1) EX1-MC | 30 | 50 |  |  |
|  |  | (B2) CFUW-MC |  |  |  |  |
|  |  | (B3) TR06U B4E |  |  |  |  |
|  |  | (B4) TR06NE B4E |  |  |  |  |
|  |  | (B5) TR066A B4E |  |  |  |  |
|  |  | (B6) TR06UL B6R |  |  |  |  |
|  |  | (B7) TR06UL B5R |  |  |  |  |
|  |  | (B8) CF-N |  |  |  |  |
|  | Others | Talc D-800 | 0.7 | 0.5 |  | 0.5 |
|  |  | Glass fiber T-786H |  |  |  | 50 |

TABLE 3-continued

|  |  |  |  |  | Example |  | Comparative Example |  |
|---|---|---|---|---|---|---|---|---|
|  |  |  |  |  | 2 | 4 | 1 | 3 |
| Evaluation results | Mechanical physical properties | Tensile strength |  | MPa | 172 | 187 | 79 | 172 |
|  |  | Tensile modulus |  | GPa | 24.3 | 35.0 | 3.2 | 15.0 |
|  | Long-term heat resistance (180° C.) | Tensile strength | 1 w | MPa |  |  | 70 |  |
|  |  |  | 2 w | MPa |  |  | 60 |  |
|  |  |  | 4 w | MPa |  |  | 32 |  |
|  |  |  | 125 d | MPa | 145 | 165 |  | 112 |
|  |  | Tensile modulus | 1 w | GPa |  |  | 3.0 |  |
|  |  |  | 2 w | GPa |  |  | 3.0 |  |
|  |  |  | 4 w | GPa |  |  | 3.0 |  |
|  |  |  | 125 d | GPa | 27 | 31 |  | 17 |
|  |  | Tensile strength retention | 1 w | % |  |  | 89 |  |
|  |  |  | 2 w | % |  |  | 76 |  |
|  |  |  | 4 w | % |  |  | 41 |  |
|  |  |  | 125 d | % | 84 | 88 |  | 65 |
|  | Long-term heat resistance (200° C.) | Tensile strength | 1 w | MPa |  |  | 23 |  |
|  |  |  | 2 w | MPa |  |  | 21 |  |
|  |  |  | 125 d | MPa | 152 | 171 |  |  |
|  |  | Tensile modulus | 1 w | GPa |  |  | 3.2 |  |
|  |  |  | 2 w | GPa |  |  | 3.0 |  |
|  |  |  | 125 d | GPa | 28 | 44 |  |  |
|  |  | Tensile strength retention | 1 w | % |  |  | 29 |  |
|  |  |  | 2 w | % |  |  | 27 |  |
|  |  |  | 125 d | % | 88 | 92 |  |  |

*: A cell with a slash means no measurement was conducted.

The details of each components shown in Table 2 and Table 3 are as follows.

<Semi-Aromatic Polyimide Resin (A)>
(A1) Polyimide resin 1 obtained in Production Example 1, Mw: 55,000

<Carbon Fiber (B)>
(B1) EX1-MC: produced by Nippon Polymer Sangyo Co., Ltd., sizing agent: epoxy-based, amount of sizing agent: 3.0 mass %, average fiber length: 6 mm, average fiber diameter: 7 μm, number of filaments: 12,000
(B2) CFUW-MC: produced by Nippon Polymer Sangyo Co., Ltd., sizing agent: urethane-based, amount of sizing agent: 3 mass %, average fiber length: 3 mm, average fiber diameter: 7 μm, number of filaments: 24,000
(B3) TR06U B4E: produced by Mitsubishi Chemical Corporation, sizing agent: urethane-based, amount of sizing agent: 2.5 mass %, average fiber length: 6 mm, average fiber diameter: 7 μm, number of filaments: 15,000
(B4) TR06NE B4E: produced by Mitsubishi Chemical Corporation, sizing agent: polyamide-based, amount of sizing agent: 3.0 mass %, average fiber length: 6 mm, average fiber diameter: 7 μm, number of filaments: 15,000
(B5) TR066A B4E: produced by Mitsubishi Chemical Corporation, sizing agent: special epoxy-based, amount of sizing agent: 3 mass %, average fiber length: 6 mm, average fiber diameter: 7 μm, number of filaments: 15,000
(B6) TR06UL B6R: produced by Mitsubishi Chemical Corporation, sizing agent: urethane-based, amount of sizing agent: 2.5 mass %, average fiber length: 6 mm, average fiber diameter: 6 μm, number of filaments: 60,000
(B7) TR06UL B5R: produced by Mitsubishi Chemical Corporation, sizing agent: urethane-based, amount of sizing agent: 2.5 mass %, average fiber length: 6 mm, average fiber diameter: 7 μm, number of filaments: 50,000
(B8) CF-N: produced by Nippon Polymer Sangyo Co., Ltd., amount of sizing agent: 1 mass % or less, average fiber length: 6 mm, average fiber diameter: 7 to 7.5 μm, number of filaments: mixture of 12,000 and 24,000

<Others>
Talc D-800: "NANO ACE D-800", produced by Nippon Talc Co., Ltd., average particle size (D50): 0.8 μm
Glass fiber T-786H: "T-786H" produced by Nippon Electric Glass Co., Ltd., average fiber diameter: 10.5 μm, average fiber length: 3 mm As shown in Table 2, the molded articles made of the polyimide molding material of each of Examples 1 to 13, which contains the semi-aromatic polyimide resin (A) and a predetermined amount of the carbon fiber (B), were excellent in flame retardancy and had good mechanical physical properties, various thermal properties, and flowability. The bending strength retention after storage at 200° C. for 2 weeks were 80% or more, and the long-term heat resistance was also excellent.

On the other hand, none of the molded articles of Comparative Example 1, which contained no carbon fiber, Comparative Example 2, in which the content of the carbon fiber was out of the predetermined range of the present invention, and Comparative Example 3, in which glass fiber was used instead of the carbon fiber, achieved flame retardancy of V-1 or higher. The molded article of Comparative Example 1 had a markedly reduced bending strength retention after storage at 200° C. for 2 weeks and additionally had poor long-term heat resistance.

Further, as can be seen from Table 2, while the molded article of Comparative Example 1 containing no carbon fiber and the 4-mm thick molded article made of the molding material of Comparative Example 3, in which glass fiber was used instead of molding material, had volume resistivity is on the order of $10^{16}$ to $10^{17}$ Ω·cm, the volume resistivity of 4-mm thick molded articles made of the polyimide molding material of each of Examples 1 to 5 is on the order of $10^{-1}$ to $10^1$ Ω·cm, and it was possible to greatly reduce the volume resistivity.

The volume resistivity (value in literature) of the commercially available polyether ether ketone resin ("PEEK 450G" produced by Victrex plc) as measured according to IEC: 60093 is $10^{16}$ Ω·cm, which is comparable to that of the semi-aromatic polyimide resin (A1) used in the present Example, whereas the volume resistivity (value in literature) of the commercially available carbon fiber reinforced resin for injection molding ("PEEK 450CA30" produced by Victrex plc) obtained by filling the polyether ether ketone resin with carbon fiber at 30 mass % as measured under the same conditions is $10^5$ Ω·cm. Even in comparison with this value, it is implicated that the molded articles made of the flame-retardant polyimide molding material of the present invention have extremely low volume resistivity.

Further, from Table 3, the molded articles made of the polyimide molding material of each of Examples 2 and 4 containing the semi-aromatic polyimide resin (A) and a predetermined amount of the carbon fiber (B) had a tensile strength retention after storage at 180° C. for 125 days of 80% or more and a tensile strength retention after storage at 200° C. for 125 days of 80% or more and were excellent in long-term heat resistance.

On the other hand, the molded article of Comparative Example 1 containing no carbon fiber had a tensile strength retention after storage at 180° C. for 4 weeks of 41% and a tensile strength retention after storage at 200° C. for 2 weeks of 27% and exhibited poor long-term heat resistance. The molded article of Comparative Example 3, in which glass fiber was used instead of the carbon fiber, had a tensile strength retention after storage at 180° C. for 125 days of 65% and exhibited poor long-term heat resistance.

Figure 2:
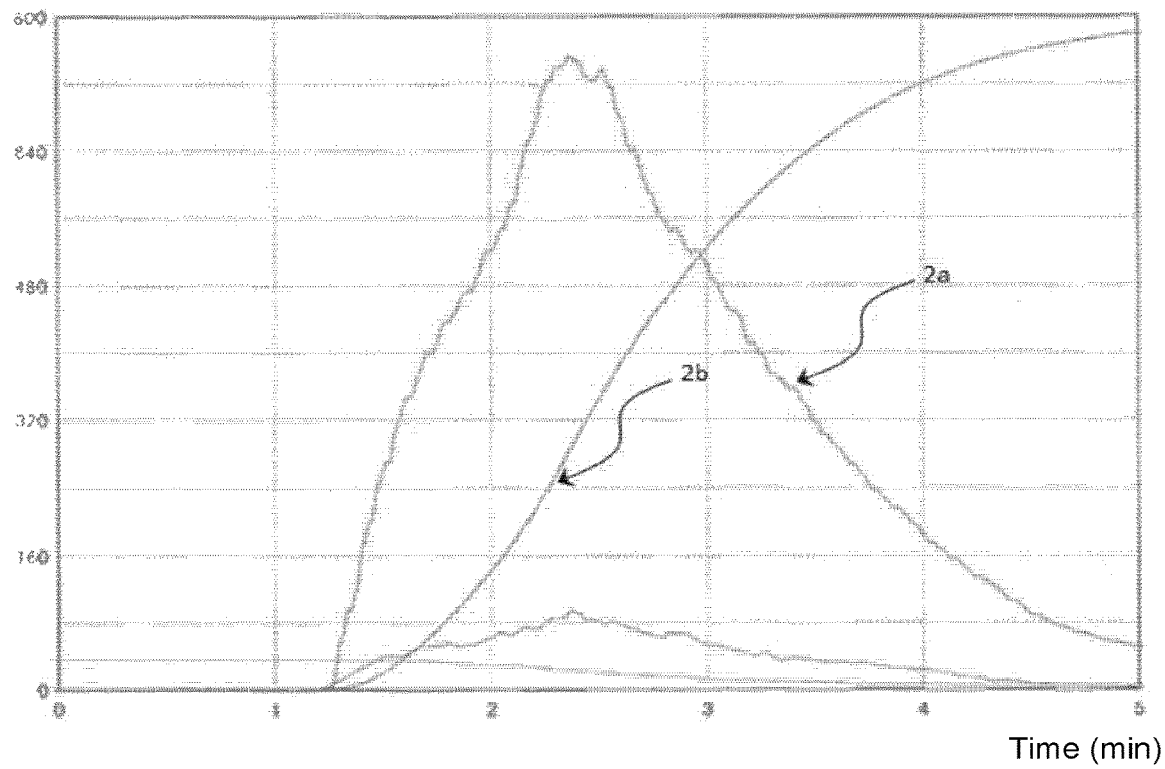
FIG. 2 is a measurement chart of the molded article of Comparative Example 1, obtained by a cone calorimeter.

Exemplary measurement results obtained with the cone calorimeter are shown in FIG. 1 and FIG. 2.

FIG. 1 is a measurement chart of the molded article of Example 4, and FIG. 2 is a measurement chart of the molded article of Comparative Example 1, both obtained with the cone calorimeter. 1a in FIGS. 1 and 2a in FIG. 2 represent the exothermic rate, and 1b in FIGS. 1 and 2b in FIG. 2 represent the total exothermic amount. The horizontal axis represents the measurement time, and the vertical axis represents the exothermic rate (kW/m$^2$) and the total exothermic amount (MJ/m$^2$, ×10). When the charts of the exothermic rate (1a and 2a) of FIG. 1 and FIG. 2 are compared, it can be seen that the molded article of Comparative Example 1 in FIG. 2 exhibits an abrupt rise in the exothermic rate in an earlier stage after start of the measurement, has a high value of the maximum exothermic rate, and is likely to burn (i.e., has low flame retardancy), in comparison with the molded article of Example 4 in FIG. 1.

Example 14 (Production and Evaluation of Polyimide Molding Material)

Carbon fiber, which is a continuous fiber having a width of 10 mm ("Tenax filament HTS40/24K" produced by Teijin Limited, average fiber diameter: 7 µm, fineness: 1,600 tex, number of filaments: 24,000) was homogeneously dusted with the polyimide resin 1 obtained in Production Example 1 such that the carbon fiber content reached 70 mass %. The same operation was repeated to laminate 12 layers in total. This was subjected to heat press molding with a vacuum pressing apparatus (produced by Kodaira Seisakusho Co., Ltd.) at a pressing machine temperature of 370° C. and a press pressure of 10 kN for a press time of 600 seconds. For this press, aluminum plates of 25 cm×25 cm×0.5 mm in thickness were placed above and below the pressing machine in order to facilitate delivery after the molding. After cooling, the aluminum plates were removed to obtain a plate having a thickness of 2.4 mm. The plate was cut with a power saw to prepare a molded article of 80 mm×10 mm×2.4 mm in thickness, which was subjected to the UL94 flammability test by the method. The flame retardancy was evaluated as corresponding to V-0.

INDUSTRIAL APPLICABILITY

The flame-retardant polyimide molding material of the present invention is excellent in molding processability as well as can be produced into a molded article having high flame retardancy and long-term heat resistance. The molded article can be applied, for example, in various industrial members, enclosures for industrial machines, members for communication devices, gears, bearings, screws, nuts, packings, IC sockets for inspection, members for household electrical products such as belts and enclosures, covering materials for electrical wire and the like, cover-lay films, members for automobiles, members for railway, members for semiconductor manufacturing apparatuses, aviation applications, medical instruments, enclosures for fishing rods, reels, and the like, stationery, carbon UD tape, and the like. The molded article, which has markedly high strength and modulus of elasticity, can be applied in substitution for various metals including an aluminum alloy and a magnesium alloy. Further, the molded article, which exhibits extremely low volume resistivity as a resin-containing molded article, also can be applied in, for example, antistatic materials, static-dissipative materials, and electromagnetic shielding materials.

REFERENCE SIGNS LIST 1a, 2a exothermic rate
1b, 2b total exothermic amount

The invention claimed is:
1. A flame-retardant polyimide molding material, comprising:
a semi-aromatic polyimide resin (A) having a weight average molecular weight Mw of from 10,000 to 150,000; and
carbon fiber (B) at a content of from 25 mass % to 65 mass %,
wherein the carbon fiber (B) comprises staple fiber having an average fiber length of less than 10 mm, wherein the carbon fiber (B) also has an average fiber diameter of from 3 to 50 µm, number of filaments in the range of from 500 to 100,000, and surface-treated with a surface treatment agent selected from the group consisting of an epoxy-based material, a urethane-based material, an acryl-based material, a polyamide-based material, a polyester-based material, a vinyl ester-based material, a polyolefin-based material, and a polyether-based material,
wherein the semi-aromatic polyimide resin (A) comprises a polyimide resin (A1) comprising a repeating structural unit of the following formula (1) and a repeating structural unit of the following formula (2):

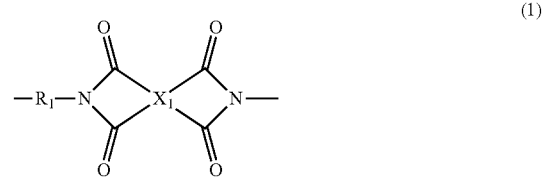

-continued

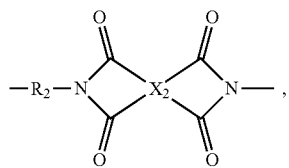
(2)

wherein $R_1$ represents a divalent aliphatic group having from 6 to 22 carbon atoms and comprising an alicyclic hydrocarbon structure,
$R_2$ represents a divalent chain aliphatic group having from 5 to 16 carbon atoms,
$X_1$ and $X_2$ each independently represent a tetravalent aromatic group having from 6 to 22 carbon atoms, and
a content ratio of the repeating structural unit of the formula (1) with respect to a total of the repeating structural unit of the formula (1) and the repeating structural unit of the formula (2) is from 20 to 70 mol %, wherein a 4-mm thick molded article made of the flame-retardant polyimide molding material has flame retardancy corresponding to V-0 in a flame retardant test according to the UL94 standard.

2. The flame-retardant polyimide molding material of claim 1, further comprising:
5 mass % or less of a flame retardant.

3. A molded article, comprising:
the flame-retardant polyimide molding material of claim 1.

4. A molded article, comprising:
the flame-retardant polyimide molding material of claim 2.

5. The flame-retardant polyimide molding material of claim 2, wherein the content of the carbon fiber (B) in the flame-retardant polyimide molding material is from 30 mass % to 65 mass %.

6. The flame-retardant polyimide molding material of claim 2, wherein the content of the carbon fiber (B) in the flame-retardant polyimide molding material is from 40 mass % to 65 mass %.

7. The flame-retardant polyimide molding material of claim 1, wherein the content ratio of the repeating structural unit of the formula (1) with respect to the total of the repeating structural unit of the formula (1) and the repeating structural unit of the formula (2) is from 20 mol % to less than 40 mol %.

8. The flame-retardant polyimide molding material of claim 1, wherein R1 is a divalent group represented by the following formula (R1-1) or (R1-2):

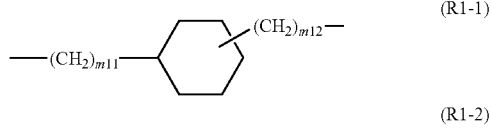
(R1-1)

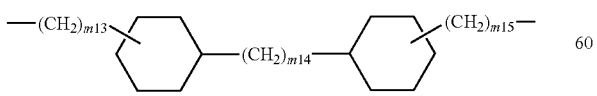
(R1-2)

wherein $m_{11}$ and $m_{12}$ in the formula (R1-1) each independently represent an integer of 0 to 2; and $m_{13}$ to $m_{15}$ in the formula (R1-2) each independently represent an integer of 0 to 2.

9. The flame-retardant polyimide molding material of claim 1, wherein $R_1$ is a divalent group represented by the following formula (R1-3):

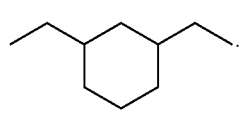
(R1-3)

10. The flame-retardant polyimide molding material of claim 1, wherein $X_1$ and $X_2$ each independently represent a tetravalent group represented by one of the following formulae (X-1) to (X-4):

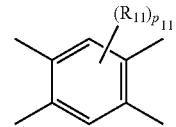
(X-1)

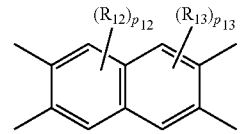
(X-2)

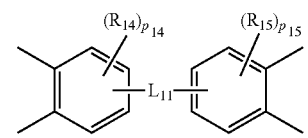
(X-3)

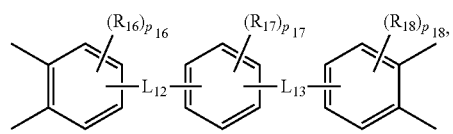
(X-4)

wherein $R_{11}$ to $R_{18}$ each independently represent an alkyl group having from 1 to 4 carbon atoms; $p_{11}$ to $p_{13}$ each independently represent an integer of 0 to 2; $p_{14}$, $P_{15}$, $P_{16}$ and $p_{18}$ each independently represent an integer of 0 to 3; $p_{17}$ represents an integer of 0-4; and $L_{11}$ to $L_{13}$ each independently represent a single bond, an ether group, a carbonyl group or an alkylene group having from 1 to 4 carbon atoms.

11. The flame-retardant polyimide molding material of claim 1, wherein $X_1$ and $X_2$ each independently represent a tetravalent group represented by the following formula (X-5) or (X-6):

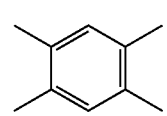
(X-5)

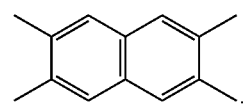
(X-6)

12. The flame-retardant polyimide molding material of claim 11, wherein $X_1$ and $X_2$ represent a tetravalent group represented by the formula (X-5).

13. The flame-retardant polyimide molding material of claim 1, wherein $R_2$ is an alkylene group having from 8 to 10 carbon atoms.

* * * * *